United States Patent [19]
Oberlin et al.

[11] Patent Number: 4,786,219
[45] Date of Patent: Nov. 22, 1988

[54] METHOD AND APPARATUS FOR MACHINING THE WALL OF A CYLINDRICAL TUBE BY MILLING A GROOVE THEREIN

[75] Inventors: Claude Oberlin, Avon; Gérard Dolhen, Ecuelles-Moret S/Loing; Jean-Claude Lemarquis, Moret S/Loing; Philippe Morand, Puilboreau, all of France

[73] Assignee: Electricite de France, France

[21] Appl. No.: 859,649

[22] Filed: May 5, 1986

[30] Foreign Application Priority Data

May 6, 1985 [FR] France .................. 85 06838

[51] Int. Cl.$^4$ ................ B23Q 15/06; B23Q 15/22
[52] U.S. Cl. .................... 409/84; 29/407; 29/558; 318/574; 364/474.02; 409/132
[58] Field of Search ............. 409/84, 131, 132, 133; 29/157.4, 404, 407, 557, 558; 394/474; 318/568, 569, 574

[56] References Cited
U.S. PATENT DOCUMENTS

| | | | |
|---|---|---|---|
| 4,384,332 | 5/1983 | McMurtry | 364/474 |
| 4,523,287 | 7/1985 | Kogawa | 364/474 X |
| 4,583,159 | 4/1986 | Kanemoto et al. | 364/474 X |
| 4,598,380 | 7/1986 | Holmes et al. | 364/474 X |
| 4,600,869 | 7/1986 | Sekine et al. | 364/474 X |

FOREIGN PATENT DOCUMENTS

| | | | |
|---|---|---|---|
| 134045 | 3/1985 | European Pat. Off. | 219/124.34 |
| 1537084 | 7/1968 | France | 82/2 B |

Primary Examiner—Z. R. Bilinsky
Attorney, Agent, or Firm—McCormick, Paulding and Huber

[57] ABSTRACT

A groove is milled along a predetermined line using a cutter (2) mounted at the end of a rotary shaft (3) which is displaced under computer control (A) via a control interface (B) in such a manner as to ensure that its axis $X_4$ remains constantly substantially perpendicular to the wall of the tube and that the depth to which the cutter penetrates into the thickness of the wall is under constant control.

7 Claims, 7 Drawing Sheets

METHOD AND APPARATUS FOR MACHINING THE WALL OF A CYLINDRICAL TUBE BY MILLING A GROOVE THEREIN

The present invention relates to a method of machining a hollow part by milling along a predetermined line of cut, and more particularly it relates to milling a curved groove in the thickness of the wall of a cylindrical tube. The invention also relates to apparatus for implementing the method.

BACKGROUND OF THE INVENTION

Milling a hollow part, and in particular milling grooves in the walls of cylindrical tubes, is an operation which is conventionally performed by qualified workmen using conventional milling tools. When a tube is being milled, the tool is generally carried on a moving support which is displaced during milling to enable the workmen to follow the desired groove contour.

In some applications, and in particular in the nuclear industry, a problem rises since: firstly, the tubes to be machined are generally in the form of fixed pipework already installed on site; and secondly, the site is not necessarily accessible to a workman for example because of proximity to a source of radioactivity. The problem becomes further complicated in some applications by virtue of the fact that the grooves must be milled to an extremely accurate depth, since the sheet or web remaining at the bottom of the groove must be very thin relative to the milling depth, yet it is essential to avoid the groove penetrating at any point into the inside of the tube.

The aim of the present invention is to provide a solution to this problem.

SUMMARY OF THE INVENTION

The present invention provides a method a method of machining a hollow part by milling along a line of cut which is predetermined relative to a theoretical surface of said part, said milling being performed by means of a cutter mounted at the end of a drive shaft which is carried by a moving support, said support being displaceable with at least two degrees of freedom in tilting and with at least one degree of freedom in translation, the quantity of material to be removed at any point of said line being determined by a reference difference between the end face of the cutter and a real reference surface, which real reference surface may be the inside surface or the outside surface of said part, said method comprising the following:

a first stage of reconnaissance of the outside surface of the part, said stage consisting in causing the cutter to follow a first trajectory at a constant distance from the theoretical surface of the part, said distance being chosen in such a manner as to ensure that the cutter never comes into contact with the part, and in performing the following operations at sample points along said line of cut measuring the distance between the end face of the cutter and the real outside surface of the part on the axis of the cutter by means of a sensor integrated in the cutter, storing said measured distance, and determining the relative error at each sample point between the real surface and the theoretical surface; and determining and storing the direction of the normal to the real outside surface at each sample point, said determination being based on the error measured at each point and on the errors measured at the points adjacent thereto;

a machining stage consisting in causing the cutter to follow said predetermined trajectory a subsequent time, with the position and the orientation of the cutter being controlled in such a manner that, at each sample point, the axis of the cutter is at a constant angle relative to the normal to the real surface and to the tangential direction to said line of cut at said point, and the distance between the end face of the cutter and the reference surface of the part is made equal to the reference difference for said point.

Generally, the reference surface is the inside surface of the part: this is particularly true when it is desirable for the bottom of the groove to be constituted by a web of constant thickness.

In this case a stage is provided during which the real inside surface of the part is determined on the basis of previously stored data relating to the real outside surface.

In a first simplified implementation the inside surface is determined by calculation on the basis of a theoretical constant thickness value in the normal direction to the real outside surface of the part.

In a second, preferred implementation, the inside surface of the part is determined by a second reconnaissance stage consisting in causing a depth probe to follow a second trajectory around which the probe is positioned at each sample point at a constant distance from the real outside surface of the part and at an orientation such that the probe axis coincides with the corresponding normal direction, the thickness of the part at each sample point is then measured and stored, thereby determining the position of the inside surface of the part at said point. This ensures that the thickness of the sheet or web remaining at the bottom of the groove remains constant regardless of the shape of the outside surface and regardless of the real thickness of the part.

In the special case of machining a curved groove in the thickness of the wall of a cylindrical tube, the moving support is simultaneously subjected to the following three motions:

rotation about a main axis which intersects and is perpendicular to the axis of the tube;

tilting about a secondary axis which intersects the cutter axis and is perpendicular to the plane constituted by said cutter axis and said main axis; and translation along a direction parallel to said main axis;

with the second and third motions being servocontrolled as a function of the first in such a manner as to ensure that the cutter remains constantly substantially perpendicular to the wall of the tube and that the cutter penetration depth into the wall of the tube is under constant control.

It will readily be understood that the method makes it possible to obtain a groove whose (flat) bottom is parallel to the zone of the inside wall of the tube in the immediate vicinity of the groove and on the other side of the remaining web, and that by properly controlling the depth to which the cutter penetrates it is possible to obtain a web of constant thickness.

In a usual application of the method, the moving support is caused to rotate about the main axis at a variable radius therefrom. Thus to obtain a closed contour groove having a shape which is close to circular, the moving support is rotated about the main axis through an angle of not less than 360°.

The present invention also provides apparatus for machining a curved groove by milling the wall of a cylindrical tube, thereby enabling the above-defined method to be implemented, said apparatus comprises:

a frame which is fixed relative to said tube:

a plate support slidably mounted relative to said frame in order to slide in a direction which is perpendicular to the axis of said tube;

a plate rotatably mounted on said plate support to rotate about a main axis which intersects the axis of said tube and which is perpendicular thereto;

a carriage slidably mounted on said plate to slide along an axis which intersects said main axis and which is perpendicular thereto;

a bracket hinged to said carriage to tilt about a secondary axis which is orthogonal to the carriage slide axis;

a milling cutter mounted on the end of a shaft which is rotatably mounted in said tilting bracket and whose axis intersects said secondary axis and is perpendicular thereto;

first control means for controlling displacement of said plate carrier relative to said fixed frame;

second control means for controlling rotation of said plate relative to said plate carrier;

third control means for controlling displacement of said carriage relative to said plate;

fourth control means for controlling tilting of said tilting bracket about said secondary axis; and fifth control means for controlling rotation of said cutter about its axis.

This apparatus is preferably equipped with a computer having a memory, said computer being used to drive said first, third and fourth control means as a function of the rotation of said plate about said main axis in such a manner as to ensure that the axis of said cutter remains constantly substantially perpendicular to the wall of said tube, and that said cutter penetrates in controlled manner into the thickness of the wall of said tube.

Further, it is preferable for each electric mot or shaft to be equipped with its own position sensor.

The control means for controlling the rotation of the plate and the tilting of the bracket are advantageously electric motors under analog control whereas the control means for controlling plate carrier sliding and carriage sliding are preferably electric motors and/or actuators under digital control.

In order to perform preliminary detection and measurement of possible unevenness in the outside surface of the tube so as to be able to correct displacement of the cutter during machining as a function of any detected unevenness, the apparatus is advantageously fitted with an optical fiber which is integrated in the cutter.

In order to perform preliminary measurements on the real thickness of the tube, so as to be able to correct the movements of the cutter during machining as a function of said real thickness, the installation is advantageously equipped with an ultrasonic emitter/receiver which is suitable for being mounted at the end of the cutter shaft, instead of the cutter.

BRIEF DESCRIPTION OF THE DRAWINGS

An implementation of the invention is described by way of example with reference to the accompanying drawings, in which.

DESCRIPTION OF PREFERRED IMPLEMENTATION

Figure 1:
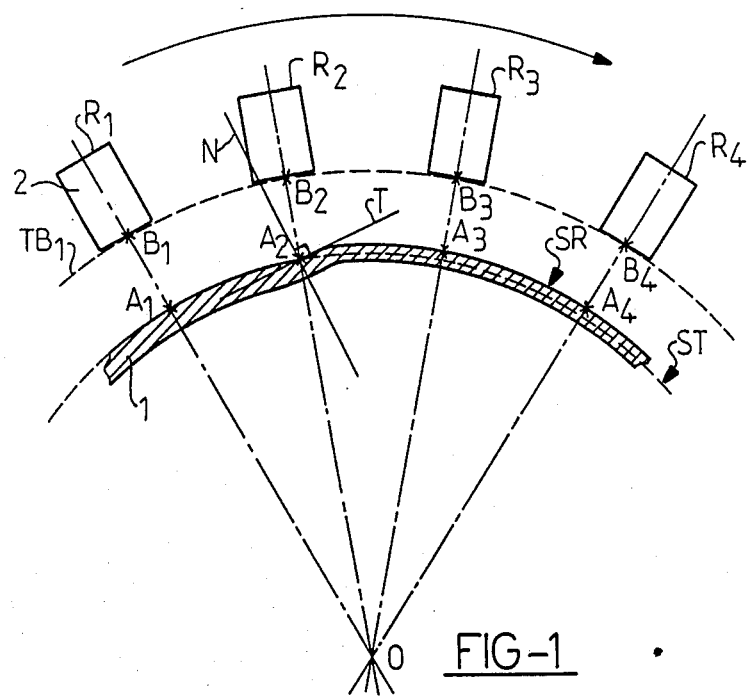
FIGS. 1 and 2 show two prior stages of surface reconnaissance on the parts to be machined.
Figure 2:
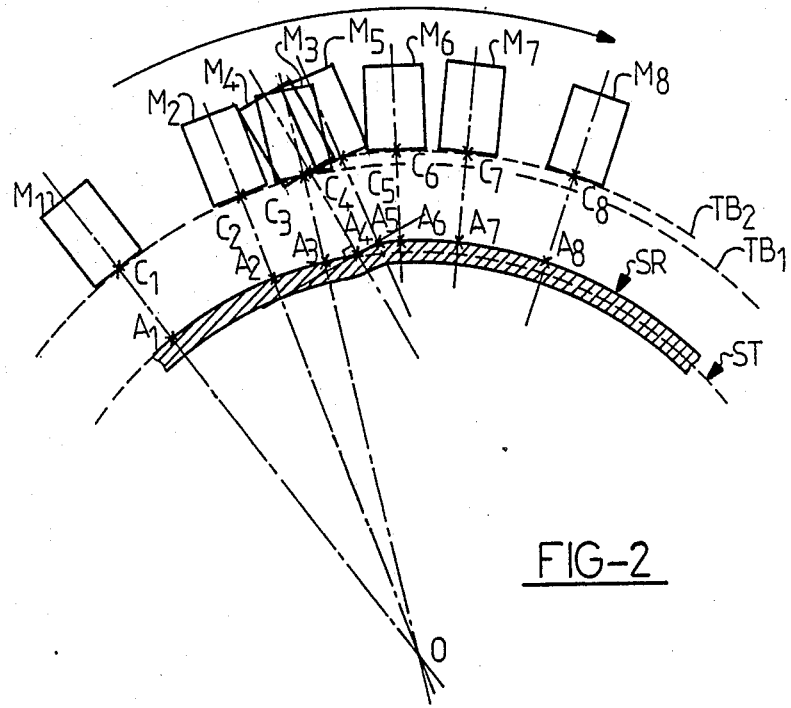
Figure 3:
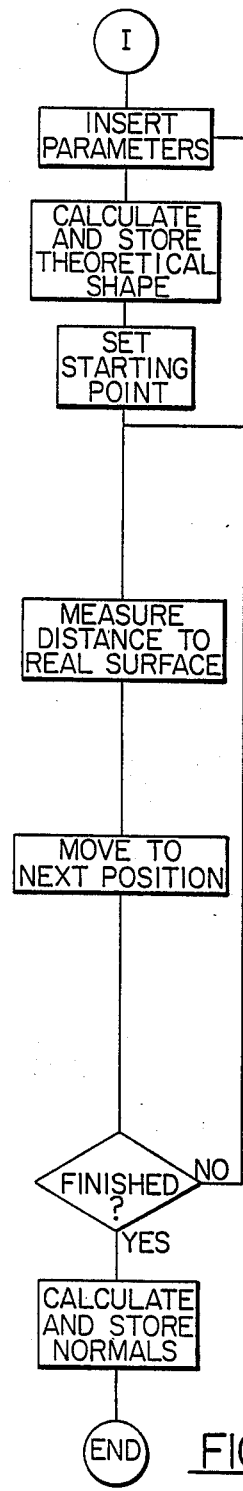
FIGS. 3–5 are flowcharts showing the successive steps of each of the stages of the method.
Figure 4:
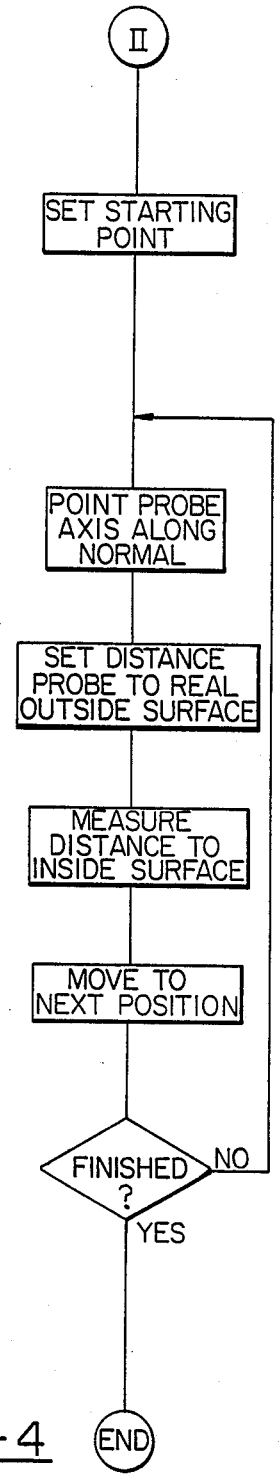
Figure 5:
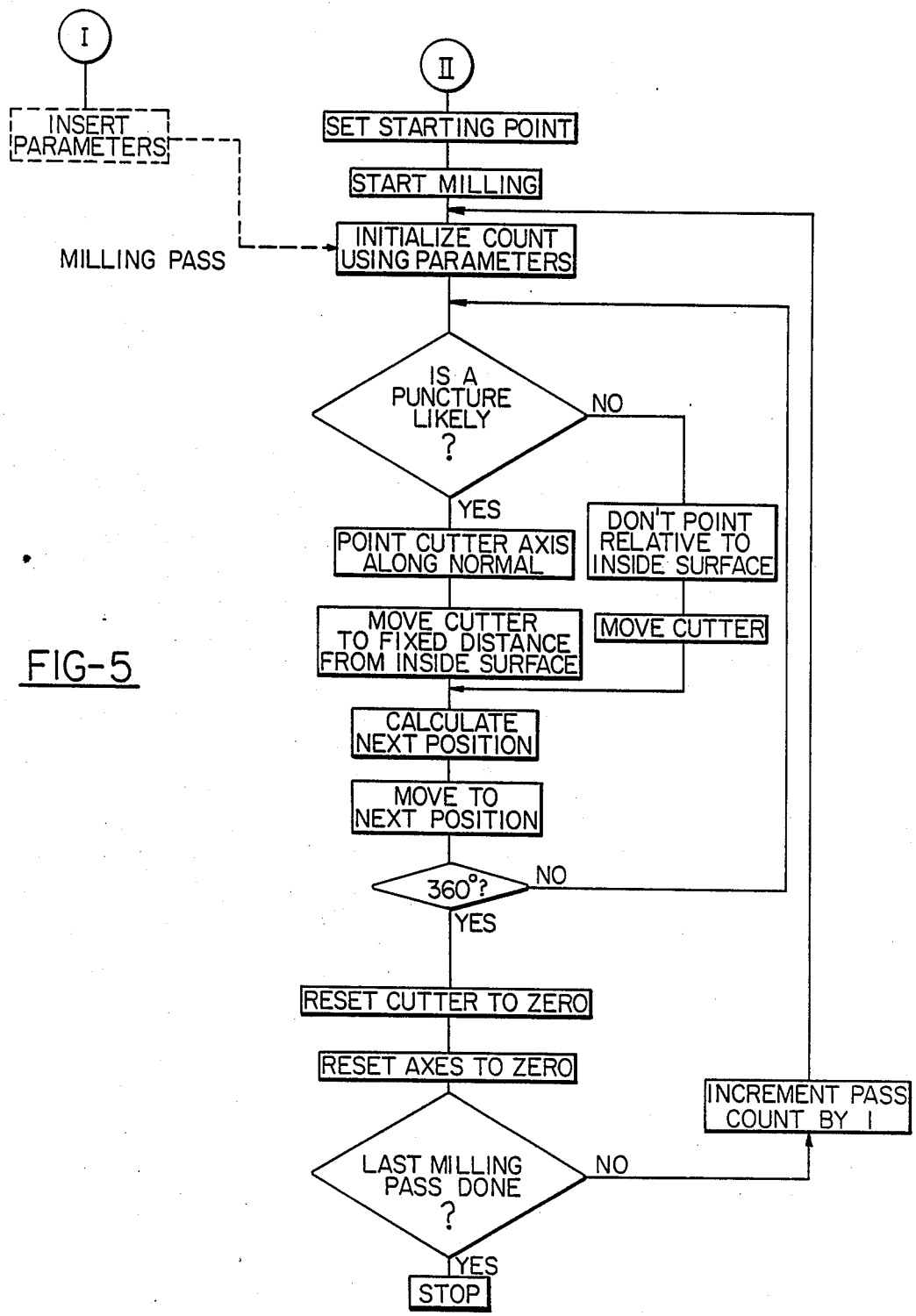

FIGS. 1 and 2 show the method of the invention in its most general aspect, with the various stages being described by the flowchart of FIGS. 3 to 5.

Reference 1 designates the hollow part to be machined (for example a cylindrical tube) and reference 2 designates a displaceable milling cutter together with its integrated sensor located at points designated B in FIG. 1 and C in FIG. 2. The structure of the cutter and its integrated sensor is described below, with reference to FIG. 6.

The method begins with a first reconnaissance stage in accordance with the flowchart of FIG. 3. The operator inserts the various parameters required for the machining operation into a computer system. For example, these parameters may be the diameter and the thickness of the tube, the position and orientation of its axis, the depth of the groove to be machined or the thickness of the metal sheet to be left behind. On the basis of such data, the computer determines and memorizes the theoretical shape of the surface to be machined, i.e. the ideal shape which would obtain if there were no irregularities in shape or thickness.

The cutter with its integrated sensor is then positioned at a starting point and a reconnaissance is performed of the outside surface at sample points, with the number of points sampled depending on the desired measurement accuracy.

This operation is illustrated in FIG. 1 and consists in measuring, at each point, the difference between the real outside surface SR and the theoretical surface ST as previously determined by calculation. To do this, the cutter is caused to follow a fist scanning trajectory $TB_1$ which is defined relative to the theoretical surface ST (since that is the only reference initially available), for example the cutter may be caused to scan along a trajectory at a constant distance from the theoretical surface, with the cutter axis remaining constantly perpendicular to the theoretical surface (in the case of a cylindrical tube, this is the same as saying that the cutter is displaced around a cylinder which is coaxial with the theoretical cylindrical surface, and which surrounds said theoretical surface).

Naturally, this constant distance is selected in such a manner as to ensure that the cutter never comes into contact with the real outside surface, given some maximum value of the size of surface irregularities which may be expected.

At each of the cutter positions $R_1 \ldots R_4$, the distances $A_1B_1 \ldots A_4B_4$ are thus measured and stored to constitute a representation of the real surface SR in the computer memory.

Also, on the basis of the distance measured at each of these points and on the basis of the distances measured at the adjacent points, the direction of the normal N to the real outside surface is also determined at each point. In FIG. 1, two types of deformation in the part to be machined are shown: at point $A_2$, a curvature fault causes the normal N to the outside surface to miss the axis O of the cylinder; and at SO points $A_3$ and $A_4$ the direction of the normal is correct (i.e. it intersects the axis O); but the corresponding portion of the cylinder is slightly offset so that the radius $OA_3$ or $OA_4$ is greater than the expected theoretical value (in which case, milling as a function solely of the theoretical surface would cause the cutter to puncture the tube, rather than leaving a thin web of metal).

A second reconnaissance stage is then performed in accordance with the flowchart of FIG. 4. The purpose of this stage is to determine the real inside surface of the tube by means of a suitable probe integrated in the cutter or substituted therefor. The probe may, for example, be a conventional type of ultrasonic probe with the echoes being analyzed to determine the exact thickness of the tube at the measuring points.

To this end, the cutter is caused to follow a second scan trajectory $TB_2$, which is different from the first scan trajectory $TB_1$, and which is defined as follows: at each sampling point defined for the preceding stage, the probe is pointed in such a manner as to ensure that its axis always lies along the normal to the surface at said point (with said normal direction being measured during the preceding stage); the probe is also displaced in such a manner as to ensure that it is always at a fixed distance from the real outside surface (which surface was measured during the preceding stage). In FIG. 2, this constant distance is refference $A_1C_1, A_2C_2, \ldots A_8C_8$. It can be seen that when the probe is in positions $M_4$ and $M_5$ that the probe is tilted so as to compensate for the curvature defect at points $A_4$ and $A_5$.

Thus, while the thickness is being measured, and hence while the inside surface of the tube is being determined, accurately constant measurement conditions are obtained, and in particular parallax errors are avoided.

In a simplified implementation of the method, this second reconnaissance stage may be omitted and the inside surface is then determined by calculation from the measured outside surface, supposing the wall thickness to be constant.

It is then possible to move on to the last machining stage, as shown in the flowchart of FIG. 5. Once milling has started, the cutter is displaced stepwise and its position is monitored at each of the points.

To begin with, the orientation of the cutter axis is determined so that it forms a constant angle relative to the normal to the real surface and to the tangential direction to the line of cut. Generally speaking the cutter is merely positioned so that its axis lies along the normal to the surface to be machined; however in some cases it may be desirable for the cutter axis to be inclined relative to the normal, in particular when machining a chamfer.

The position of the cutter is also adjusted in such a manner as to ensure that it remains at a constant distance from the inside surface of the wall as represented in the computer memory on the basis of the preceding reconnaissance stages. This constant distance is equal to the thickness of metal web which is to be left at the bottom of the groove.

Machining is continued in this manner along the line of cut with the orientation of the cutter and its penetration depth into the part being machined being constantly adjusted.

Figure 6:
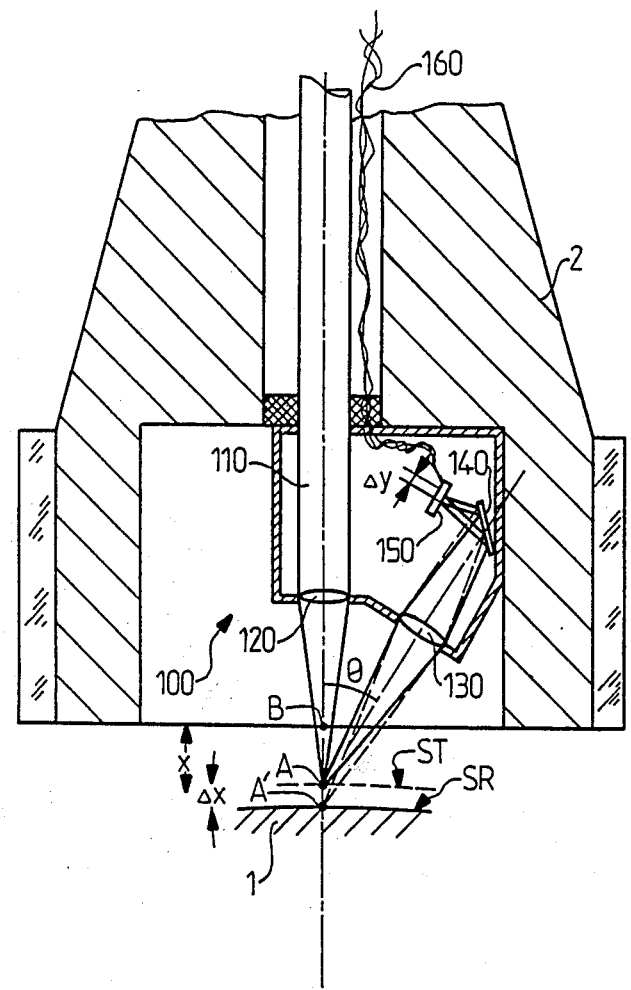
FIG. 6 is a diagrammatic view of an optical sensor integrated in the milling cutter, enabling the outside surface of the part to be recognized.

FIG. 6 shows one example of a cutter, referenced 2, provided with an integrated optical sensor 100 for determining the distance which exists between the real surface SR and the theoretical surface ST by using the conventional principle of optical triangulation. Light emission (coherent or otherwise) is conveyed along an optical fiber 110 and focused by a lens 120 on a point A, which corresponds to the theoretical surface on the cutter axis (such that the distance AB between the theoretical surface and the bottom face of the cutter is maintained constant, as mentioned above). The reflected light energy is received and focused by a lens 130 which directs it towards a reflector 140 and thence to a photoelectric detector 150. The photoelectric detector may be constituted, for example, by a strip of diodes, or in a simplified version it may be constituted by a pair of photocells for a simple differential measurement. An electrical conductor 160 returns the sensed signal to the computer driving the apparatus.

Any error $\Delta x$ between the theoretical surface ST and the real surface SR (beam reflected at A' instead of at A) gives rise to a corresponding displacement $\Delta y$ of the object point over the detector 150. The displacement $\Delta y$ may be determined as a function of the geometry of the assembly; to first approximation, this variation is directly proportional to the error $\Delta x$.

There now follows a description of a specific example of apparatus for implementing the method, applied to machining a curved groove in a cylindrical tube. The shape of the groove is the shape of the intersection of two cylinders, and its projection onto a plane is therefore circular. The method is especially applicable to making a tapping point in a duct for radioactive fluid, as taught in the present Assignees' French patent application No. 2 543 257, and the teaching of that document may be considered as being incorporated in the present application.

Figure 7:
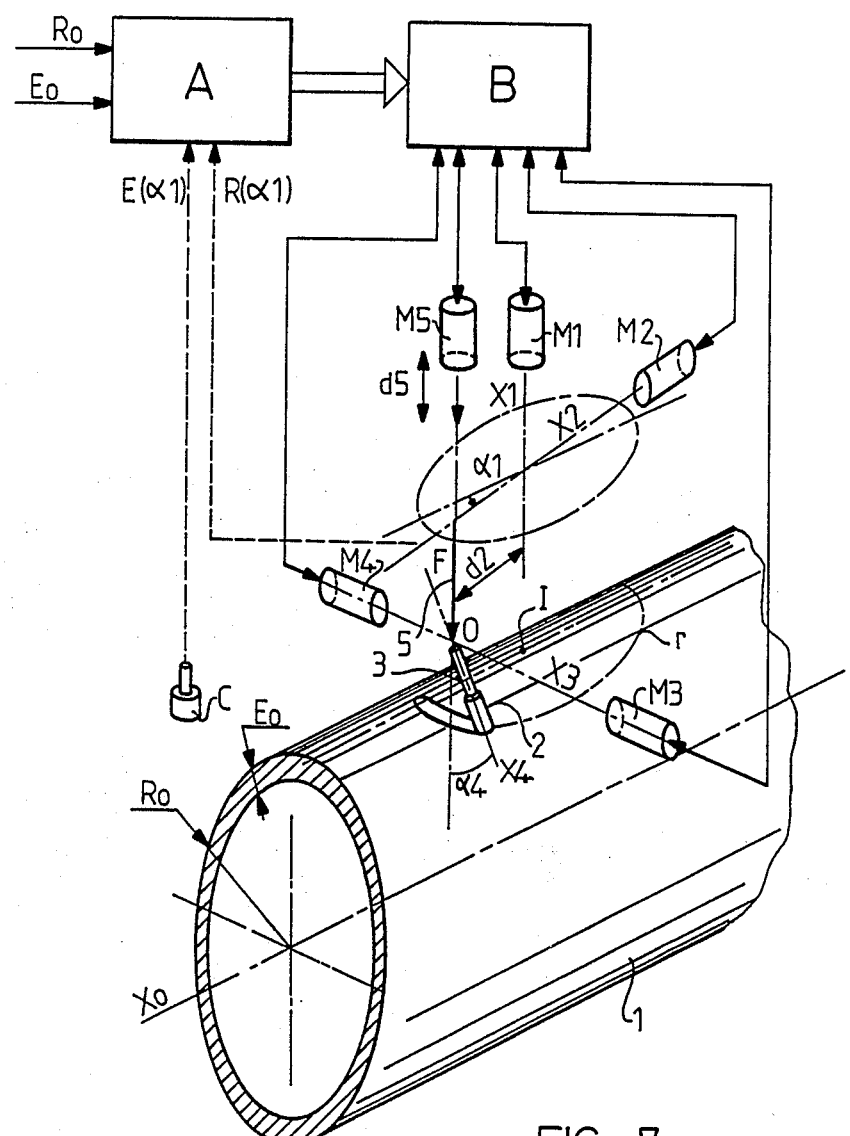
FIG. 7 is a diagrammatic perspective view showing apparatus in accordance with the invention and illustrating the method of the invention.
Figure 8:
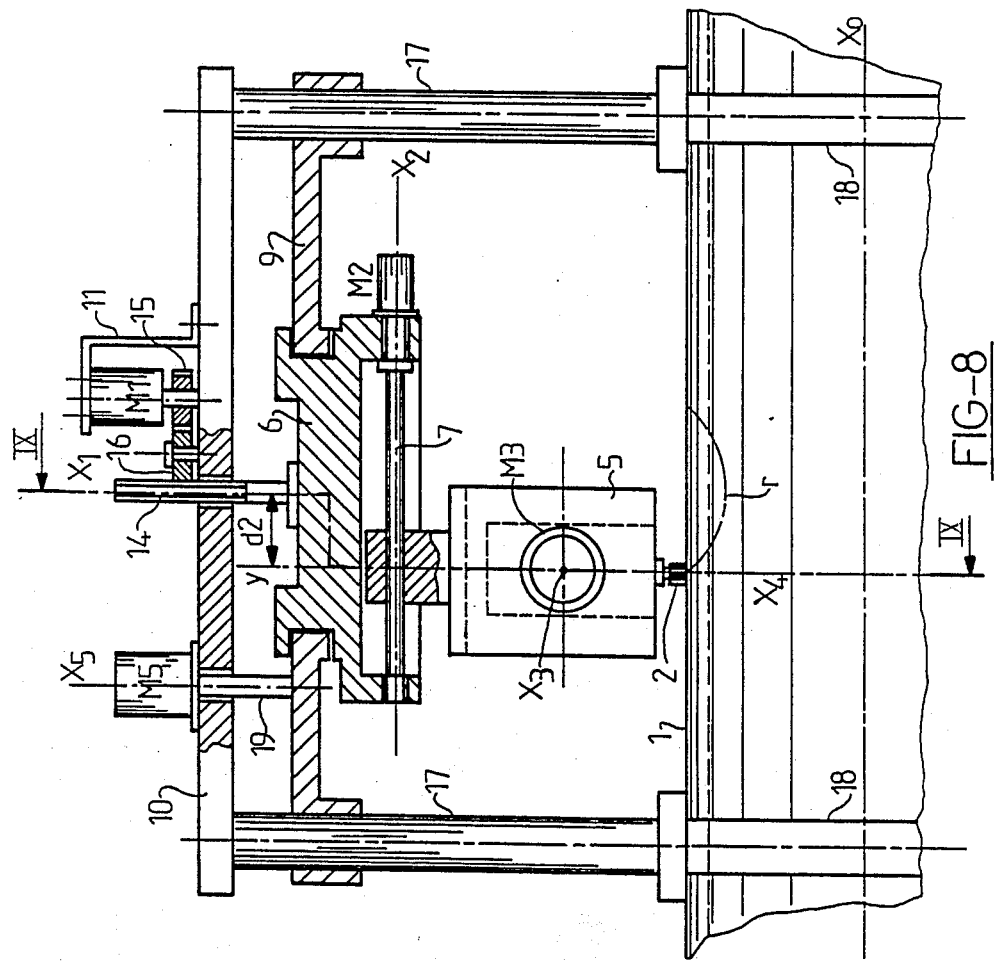
FIG. 8 is a side view, in partial section of machining apparatus mounted on a tube to be machined, shown prior to machining.
Figure 9:
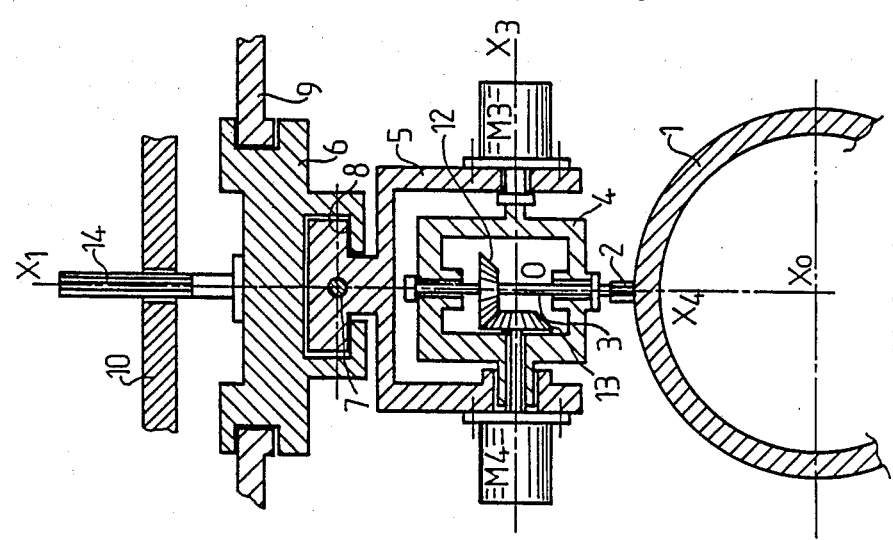
FIG. 9 is an end view of the FIG. 8 apparatus, shown in section on a staggered plane IX—IX.
Figure 11:
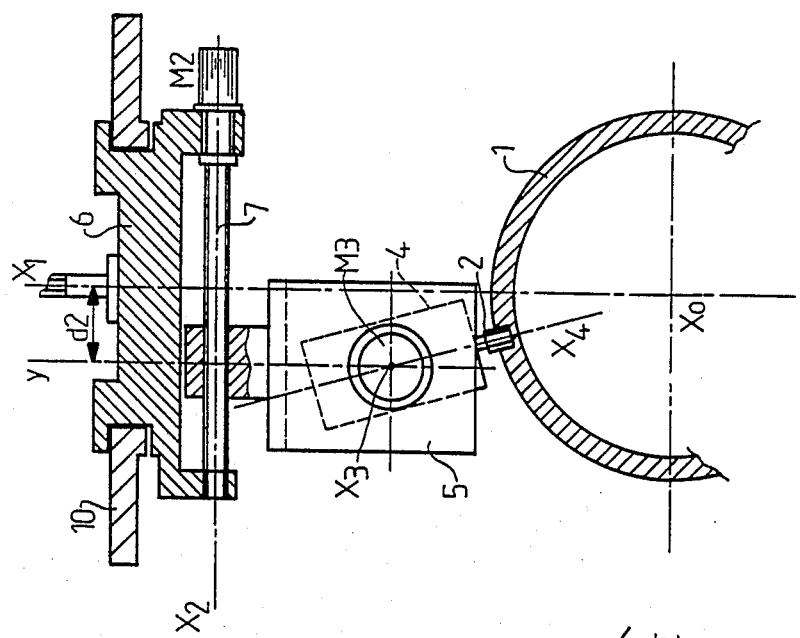
FIG. 11 is an oblique section along a plane XI—XI of the FIG. 10 apparatus, which plane XI—XI is at an angle part way between the planes of FIGS. 8 and 9, during machining.
Figure 10:
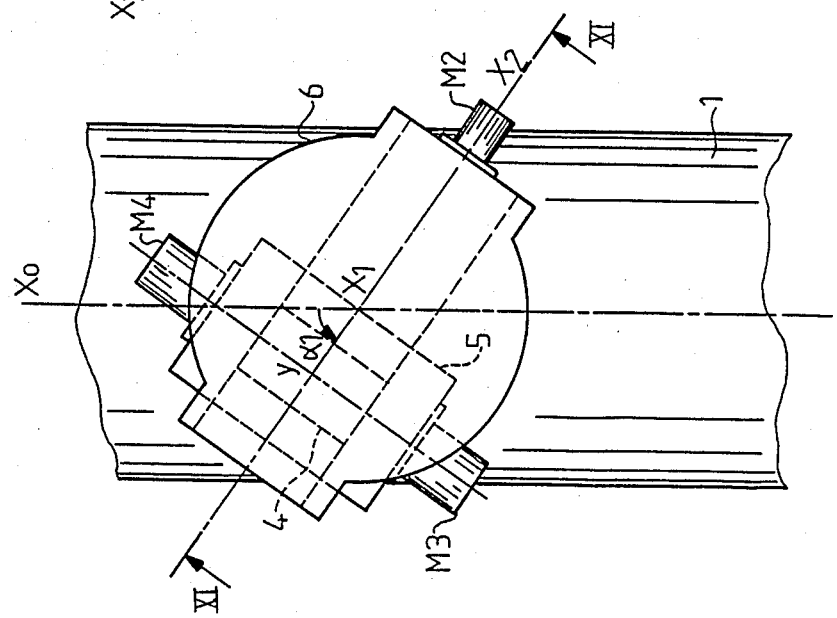
FIG. 10 is a fragmentary plan view of the apparatus shown in FIGS. 8 and 9, shown during machining.

FIG. 7 shows a cylindrical tube 1, e.g. a metal tube, which is disposed horizontally and which has a radius $R_o$ and wall thickness $E_o$.

The radius $R_o$ may lie in the range 50 mm to 500 mm, for example, and the wall thickness $E_o$ may lie in the range 5 mm to 85 mm, for example.

For explanation purposes, the tube 1 is shown in FIG. 7 as being sectioned, however in practice it constitutes part of continuous pipework which is already fixed in place on site.

The apparatus comprises the milling cutter 2 which is mounted on the end of a shaft 3 having an axis $X_4$ and driven by a motor $M_4$.

The shaft 3 is carried by a support (not shown in FIG. 7 for the purposes of clarification) which is hinged to a carriage 5 (which is represented in the figure by a vertical segment). The carriage 5 is arranged to be rotatable about a vertical axis $X_1$, hereinafter referred to as the main axis, which axis intersects the horizontal axis $X_o$ of the tube at a point I. The carriage 5 is offset horizontally from the main or vertical axis $X_1$ by an adjustable distance $d_2$. A motor $M_1$ serves to rotate the carriage about the main axis $X_1$. A motor $M_2$ serves to change the distance $d_2$. The cutter 2 (and its support, not shown) are hinged about an axis $X_3$, hereinafter referred to as the "secondary" axis. This "secondary" axis is horizontal and intersects the axis $X_4$ of the cutter shaft, and it is perpendicular to the plane formed by the axe $X_4$ and $X_1$. A motor $M_3$ is used to tilt the cutter (and its support) about the axis $X_3$. The assembly constituted by the carriage 5, the cutter support, and the cutter 2 is vertically displaceable parallel to the main axis $X_1$.

This movement is under the control of an electric actuator or motor $M_5$.

The apparatus further includes a computer having a memory A and arranged to drive the motors $M_1$, $M_2$, $M_3$, $M_4$, $M_5$ via a control interface B.

The apparatus is fitted with a device for detecting and measuring the real shape of the tube surface, and this device is connected to the computer A. The device is constituted by an optical fiber housed coaxially inside the cutter shaft 3 and inside the cutter 2 and opening out into the end face thereof. The fiber is disposed, in conventional manner, to provide the computer with data on the proximity of a surface facing the fiber, i.e. the outside surface of the tube.

The apparatus is also equipped with a device for measuring the thickness of the tube wall, which device is also connected to the computer A. This device is constituted by an ultrasonic emitter/receiver C of known type and suitable for providing the computer with data on the thickness of a wall presented thereto, i.e. on the thickness of the wall of the tube 1. The emitter/receiver C has a stock identical to the stock of the cutter 2, thereby allowing the emitter/receiver to be mounted on the end of the shaft 3.

The object is to machine a curved groove of closed contour r in the outside wall of the fixed tube 1. This contour is approximately circular in shape. It is desirable for the web remaining between the bottom of the groove and the inside wall of the tube should be very thin and of constant thickness, e.g. 0.2 mm thick.

To this end, the apparatus is placed over the tube where machining is to take place and data $D_o$ and $E_o$ are inserted into the computer memory to inform the computer on the theoretical diameter and thickness of the tube where milling is to take place. The distance $d_2$ is servocontrolled by means of the motor $M_2$ so that it corresponds to the radius r of the contour which is to be obtained.

A first non-machining inspection stage is then performed by causing the cutter to follow a trajectory corresponding to the contour r of the groove. At this stage the cutter is not rotated. The trajectory is governed by the various advances provided by motors $M_5$ and $M_3$ as a function of the angle of rotation $\alpha_1$ of the carriage 5 as controlled by the motor $M_1$. The apparatus is driven by the computer A via the control interface B as a function of data previously stored in its memory concerning the theoretical diameter $D_o$ of the tube and its theoretical thickness $E_o$. The cutter is driven in such a manner as to ensure that its end face passes close to the outside wall of the tube while remaining substantially parallel thereto, and without touching it. During the displacement of the cutter, the optical fiber integrated therein detects possible departures in the real outside surface of the tube wall from its idealized or theoretical shape. In particular it detects bumps, hollows, and ovalization of the tube. The real radius R of the tube as a function of the angle $\alpha_1$ of rotation of the carriage 5 constitutes part of the data which is stored in the computer A.

After one complete turn ($\alpha_1 = 360°$), the cutter 2 is removed from its shaft 3 and it is replaced by the ultrasonic emitter/receiver C. A second inspection stage is then performed, still without machining the surface of the tube. In this second inspection stage the ultrasonic emitter/receiver C follows a path corresponding to the contour r of the groove to be milled. While following this path the real thickness E of the wall is measured as a function of the angle of rotation $\alpha_1$ and is stored in the memory of the computer A.

After a second complete turn ($\alpha_1 = 360°$) the emitter/receiver C is again exchanged for the cutter and machining, per se is now performed. The motor $M_4$ is switched on to rotate the cutter 2.

Then, the computer A controls groove milling via the interface B by driving the carriage 5 to rotate about the main axis $X_1$ 1 and by advancing the motors $M_3$ and $M_5$ as a function of the angle of rotation $\alpha_1$. While driving the cutter in this way, account is taken both of the real radius $R(\alpha_1)$ of the tube and its effective thickness $E(\alpha_1)$ so as to ensure, firstly that the axis $X_4$ of the cutter remains substantially perpendicular to the outside wall of the tube, and secondly that it penetrates into the wall in a controlled manner.

The starting position corresponds, for example, to a milling zone situated on the top of the tube so that the axis $X_4$ of the cutter is then disposed vertically, perpendicularly to the axis $X_o$ of the tube. One-fourth of a turn later, the axis of the cutter is radially disposed, i.e. it intersects and is perpendicular to the axis $X_o$ of the tube. After one-half of a turn about the main axis, the cutter is again vertical, and after three-quarters of a turn it is again radial. In between these four positions, where the axis $X_4$ is exactly perpendicular to the outside wall of the tube, the cutter is driven by the computer in such a manner as to be substantially perpendicular to the outside wall of the tube so that the bottom of the groove is substantially parallel to the inside wall of the tube.

When the penetration is said to be "controlled" it means that the degree of cutter penetration is selectable by suitably programming the computer so that either the penetration is constant or else the thickness of the remaining web is constant, i.e. the distance between the bottom of the groove and the inside wall of the tube remains constant.

It is thus possible to use successive passes on a tube having a wall thickness of a few tens of millimeters, for example, to provide a groove whose bottom wall thickness is very thin, for example it may be a few tenths of a millimeter thick. The machining is performed over an angle $\alpha_1$ which is not less than 360°, e.g. it may be performed through an angle of 365° so as to obtain a completely closed groove.

In some applications, it is possible to use the computer A to modify the radius $d_2$ continuously as a function of the angle $\alpha_1$, thereby obtaining contours of variable curvature.

FIGS. 8 to 11 show a particular embodiment of machining apparatus for performing the above-described method.

The apparatus is in the form of a bridge comprising a horizontal plate 10 and a pair of vertical columns 11 which are fixed to the tube to be machined 1 by means of suitable fixing clamps 18.

The cutter shaft 3 is guided to rotate in a support bracket 4. It carries a conical coaxial gear wheel 12 which meshes with the complementary gear wheel 13 whose axis is disposed perpendicularly relative to the axis $X_4$ of the shaft 3. The support bracket 4 is hinged gimbal-like between the arms of a downwardly directed fork or clevis which constitutes the carriage 5. One of the arms of the carriage clevis supports a motor $M_3$ suitable for tilting the support 4 about an axis $X_3$ which is perpendicular to the cutter shaft axis $X_4$, and the other arm carries the motor $M_4$ suitable for driving the cutter 2 via the conical gear wheels 12 and 13. The top of the carriage is in the form of a T which is slidably dovetailed in a horizontal slideway 8 made in a plate 6 which is approximately circular. The T of carriage 5 has a tapped hole passing therethrough about an axis $X_2$ which is parallel to the slideway 8 and which receives a threaded rod 7 mounted on the plate 6. A motor $M_2$ mounted on the plate 6 is arranged to rotate the rod 7, and thereby displace the carriage 5 on the slideway 8. The plate 6 is fixed, at its center, to a vertical fluted shaft about an axis $X_1$ and disposed to be rotated by a motor $M_1$ via gear wheels 15 and 16. The motor $M_1$ is fixed by means of a bracket 11 to the horizontal plate 10 of the apparatus frame. Rotating the motor $M_1$ causes the plate 6 to rotate via the shaft 14, while leaving the shaft 14 free to move axially.

The plate 6 is guided to rotate within a plate-supporting collar 9 which is similarly in the form of a horizontal plate and which is slidably mounted on the vertical columns 17. The collar 9 is caused to move up and down by an electric actuator or motor $M_5$ by means of a rod 19 having a vertical axis $X_5$.

In order to machine a groove in the wall of a tube, after prior detecting and recording of any anomalies in the surface or the thickness of said wall, the radius of curvature $d_2$ is initially adjusted to the desired value by means of the motor $M_2$. Then, starting from an initial position in which the cutter 2 is in contact with the top of the tube 1 (the position shown in FIGS. 8 and 9), the plate 6 is caused to rotate about the axis $X_1$ by the motor $M_1$. The average vertical axis Y of the carriage 5 thus describes a circular trajectory around the axis $X_1$.

The inclination of the cutter axis $X_4$ is controlled during machining by the motor $M_3$ which causes the support bracket 4 to tilt in one direction or the other. It should be observed that driving the cutter via conical gear wheels 12 and 13 makes such rocking possible.

The motor $M_5$ is used to control the depth to which the cutter penetrates into the wall of the tube by raising and lowering the collar 9 and the set of items carried thereby. The plate 6 may continue to be rotated during such up and down motion by virtue of the fluted shaft 14 which meshes with the gear wheel 16 under the control of the motor $M_1$.

It should be observed that the above-described apparatus is highly flexible in use. It is readily installed on site since its total weight is less than 50 kg. The electrical connections between the apparatus and its control interface B may be provided by a single cable. The interface B houses all the power equipment required for controlling DC and stepper motors and for receiving measurement signals from various sensors and coders.

It will readily be understood, that although the above description concerns machining a groove in the top of a tube, the above-described apparatus is capable of being used for machining a groove in any part of a tube provided the apparatus is suitably fixed thereto.

We claim:
1. A method of machining a hollow part by milling along a line of cut which is predetermined relative to a theoretical surface of said part, said milling being performed by means of a cutter mounted at the end of a drive shaft which is carried by a moving support, said support being displaceable with at least two degrees of freedom in tilting and with at least one degree of freedom in translation, the quantity of material to be removed at any point of said line being determined by a reference difference between the end face of the cutter and a real reference surface, which real reference surface may be the inside surface or the outside surface of said part, said method comprising the following:

a first stage of reconnaissance of the outside surface of the part, said stage consisting in causing the cutter to follow a first trajectory at a constant distance from the theoretical surface of the part, said distance being chosen in such a manner as to ensure that the cutter never comes into contact with the part and in performing the following operations at sample points along said line of cut:

measuring the distance between the end face of the cutter and the real outside surface of the part on the axis of the cutter by means of a sensor integrated in the cutter, storing said measured distance, and determining the relative error at each sample point between the real surface and the theoretical surface; and determining and storing the direction of the normal to the real outside surface at each sample point, said determination being based on the error measured at each point and on the errors measured at the points adjacent thereto;

a machining stage consisting in causing the cutter to follow said predetermined trajectory a subsequent time, with the position and the orientation of the cutter being controlled in such a manner that, at each sample point, the axis of the cutter is at a constant angle relative to the normal to the real surface and to the tangential direction to said line of cut at said point, and the distance between the end face of the cutter and the reference surface of the part is made equal to the reference difference for said point.

2. A method according to claim 1, wherein the reference surface is the inside surface of the part, and wherein a stage is provided for determined the real inside surface of the part on the basis of previously stored data relating to the real outside surface thereof.

3. A method according to claim 2, wherein the inside surface is determined by calculation on the basis of a theoretical constant thickness value in the normal direction to the real outside surface of the part.

4. A method according to claim 2, wherein the stage of determining the inside surface of the part is a second reconnaissance stage, consisting in causing a depth probe to follow a second trajectory around which the probe is positioned at each sample point at a constant distance from the real outside surface of the part and at an orientation such that the probe axis coincides with the corresponding normal direction, the thickness of the part at each sample point is then measured by the probe and stored, thereby determining the position of the inside surface of the part at said point.

5. A method according to claim 1, wherein the part to be ma is a cylindrical tube, and wherein the moving support is simultaneously subjected to three motions:

rotation about a main axis which intersects and is perpendicular to the axis of the tube;

tilting about a secondary axis which intersects the cutter axis and is perpendicular to the plane constituted by said cutter axis and said main axis; and translation along a direction parallel to said main axis:

with the second and third motions being servocontrolled as a function of the first in such a manner as to ensure that the cutter remains constantly substantially perpendicular to the wall of the tube and that the cutter penetration depth into the wall of the tube is under constant control.

6. A method according to claim 5, wherein the moving support is caused to rotate at a variable radium about said main axis.

7. A method according to claim 6 for providing a groove following a closed contour which is close to a circle in shape, wherein the moving support is caused to rotate about the main axis through an angle of not less than 360°.

* * * * *